US012006185B2

(12) United States Patent
Sarkar et al.

(10) Patent No.: US 12,006,185 B2
(45) Date of Patent: Jun. 11, 2024

(54) CONTINUOUS QUALITY MONITORING OF A CONVEYANCE SYSTEM

(71) Applicant: Otis Elevator Company, Farmington, CT (US)

(72) Inventors: Soumalya Sarkar, Manchester, CT (US); Teems E. Lovett, Friendswood, TX (US); Paul R. Braunwart, Hebron, CT (US); Sudarshan N. Koushik, West Hartford, CT (US); Nikola Trcka, West Hartford, CT (US); George Scott Copeland, Wethersfield, CT (US); George S. Ekladious, Quebec (CA); Peter Liaskas, Norwalk, CT (US); Sandeep Sudi, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 1523 days.

(21) Appl. No.: 16/165,856

(22) Filed: Oct. 19, 2018

(65) Prior Publication Data

US 2020/0122967 A1 Apr. 23, 2020

(51) Int. Cl.
*B66B 5/00* (2006.01)
*B66B 1/28* (2006.01)
*B66B 1/34* (2006.01)

(52) U.S. Cl.
CPC .............. *B66B 5/0025* (2013.01); *B66B 1/28* (2013.01); *B66B 1/3461* (2013.01); *B66B 5/0037* (2013.01)

(58) Field of Classification Search
CPC .................... B66B 5/00; B66B 5/0006; B66B 5/0018–0037
See application file for complete search history.

(56) References Cited

U.S. PATENT DOCUMENTS 5,329,077 A 7/1994 Skalski et al.
6,305,502 B1 10/2001 He et al.
(Continued)

FOREIGN PATENT DOCUMENTS

CN 101332952 A 12/2008
CN 201406235 Y 2/2010
(Continued)

OTHER PUBLICATIONS

Harmon, Bill et al., "Elevator Performance Meter vs. Ride Analysis Tools", available at: http://www.elevatorworld.com/pdf/ed_book_chapters/ed_focus/Chapter_15.pdf, accessed Oct. 19, 2018, Educational Focus: Testing Equipment, 12 pages.
(Continued)

*Primary Examiner* — Christopher Uhlir
(74) *Attorney, Agent, or Firm* — CANTOR COLBURN LLP

(57) ABSTRACT

A monitoring system includes one or more detection devices, a communication device, and an analytics system. The one or more detection devices generate, at a conveyance system, one or more data streams describing the ride of the conveyance system, where the data streams include at least one of vibration data and audio data. The communication device transmits sensor data based on the one or more data streams. The analytics system receives the sensor data from the communication device and, based on the sensor data, determines a ride quality of the conveyance system.

16 Claims, 4 Drawing Sheets

(56) References Cited

U.S. PATENT DOCUMENTS

| | | | |
|---|---|---|---|
| 6,516,923 B2 | 2/2003 | Lence Barreiro et al. | |
| 6,854,565 B2 | 2/2005 | Peraelae et al. | |
| 6,863,161 B2 * | 3/2005 | Mearns | B66B 5/0037 187/247 |
| 7,004,289 B2 | 2/2006 | Shrum, III et al. | |
| 7,073,633 B2 | 7/2006 | Weinberger et al. | |
| 7,143,001 B2 | 11/2006 | Karasek | |
| 7,423,398 B2 | 9/2008 | Tyni et al. | |
| 7,434,666 B2 | 10/2008 | Tyni et al. | |
| 7,484,598 B2 | 2/2009 | Tyni et al. | |
| 7,743,891 B2 | 6/2010 | Tyni et al. | |
| 7,958,970 B2 | 6/2011 | Ma et al. | |
| 8,540,057 B2 * | 9/2013 | Schuster | B66B 5/0006 187/247 |
| 8,893,858 B2 * | 11/2014 | Shi | B66B 5/0025 187/247 |
| 9,309,089 B2 * | 4/2016 | Annen | B66B 3/00 |
| 9,469,503 B2 | 10/2016 | Bunter | |
| 9,586,790 B2 | 3/2017 | Tyni et al. | |
| 9,604,818 B2 | 3/2017 | Kallioniemi et al. | |
| 10,766,741 B2 * | 9/2020 | De Angelis | B66B 3/002 |
| 2014/0058700 A1 | 2/2014 | Gehrke | |
| 2014/0330535 A1 | 11/2014 | Van Den Heuvel et al. | |
| 2016/0031676 A1 | 2/2016 | Haipus | |
| 2017/0029244 A1 | 2/2017 | Madarasz et al. | |
| 2017/0247226 A1 * | 8/2017 | Roberts | B66B 7/1215 |
| 2018/0044134 A1 | 2/2018 | Copeland et al. | |
| 2018/0148298 A1 | 5/2018 | De Angelis | |
| 2018/0248955 A1 | 8/2018 | Kinnari et al. | |
| 2020/0071125 A1 * | 3/2020 | Kuhn | B66B 1/3461 |
| 2020/0317471 A1 * | 10/2020 | Kim | G01D 21/02 |

FOREIGN PATENT DOCUMENTS

| | | | |
|---|---|---|---|
| CN | 102556792 | A | 7/2012 |
| CN | 102656109 | A | 9/2012 |
| CN | 102897623 | A | 1/2013 |
| CN | 205472067 | U | 8/2016 |
| EP | 2683612 | B1 | 6/2016 |
| EP | 3190075 | A1 | 7/2017 |
| JP | 2000313570 | A | 11/2000 |
| JP | 2005247470 | A | 9/2005 |
| WO | 2017178495 | A1 | 10/2017 |
| WO | 2018151403 | A2 | 8/2018 |
| WO | 2018166994 | A1 | 9/2018 |

OTHER PUBLICATIONS

Lorsbach, Gregory, "Analysis of Elevator Ride Quality, Vibration", available at: http://www.elevatorworld.com/pdf/ed_book_chapters/ed_focus/Chapter_15.pdf, accessed Oct. 19, 2018, Educational Focus: Testing Equipment, 4 pages.

Schmitt, Rainer, Testing Equipment, available at: http://www.elevatorworld.com/pdf/ed_book_chapters/ed_focus/Chapter_15.pdf, accessed Oct. 19, 2018, Educational Focus: Testing Equipment, 1 page.

European Search Report for application EP 19204438.6, dated Mar. 20, 2020, 41 pages.

European Search Report for Application No. 19204438.6; dated Aug. 9, 2021; 4 Pages.

* cited by examiner

CONTINUOUS QUALITY MONITORING OF A CONVEYANCE SYSTEM

BACKGROUND

Exemplary embodiments pertain to the art of conveyance systems and, more particularly, to continuous quality monitoring of an elevator system or other conveyance system.

Ride quality of elevator systems is one of the main metrics of passenger comfort in an elevator car. Currently, ride quality is measured during commissioning and during maintenance. A technician places a portable device on the floor of the elevator car. The portable device takes measurements related to the ride quality. These measurements are readable by the technician to determine the quality of the ride at that time.

SUMMARY

According to an embodiment, a monitoring system includes one or more detection devices, a communication device, and an analytics system. The one or more detection devices generate, at a conveyance system, one or more data streams describing the ride of the conveyance system, where the data streams include at least one of vibration data and audio data. The communication device transmits sensor data based on the one or more data streams. The analytics system, at least a part of which is remote from the conveyance system, receives the sensor data from the communication device and, based on the sensor data, determines a ride quality of the conveyance system in real time.

According to another embodiment, a monitoring method includes generating, at a conveyance system, one or more data streams describing the ride of a conveyance system, where the data streams include at least one of vibration data and audio data. Sensor data based on the one or more data streams is transmitted to an analytics system remote from the conveyance system. A ride quality of the conveyance system is determined in real time, based on the sensor data.

According to yet another embodiment, a computer-program product for monitoring a conveyance system includes a computer-readable storage medium having program instructions embodied therewith. The program instructions are executable by a processing unit to cause the processing unit to perform a method. The method includes generating, at a conveyance system, one or more data streams describing the ride of the conveyance system, where the data streams include at least one of vibration data and audio data. Further according to the method, sensor data based on the one or more data streams is transmitted to an analytics system remote from the conveyance system. A ride quality of the conveyance system is determined in real time, based on the sensor data.

In addition to one or more of the features described herein, or as an alternative, in further embodiments, the one or more data streams generated at the conveyance system include vibration data generated by a vibration sensor or audio data captured by a microphone, or both.

In addition to one or more of the features described herein, or as an alternative, in further embodiments, the conveyance system is an elevator system.

In addition to one or more of the features described herein, or as an alternative, in further embodiments, the vibration sensor detects a trigger event and generates the vibration data responsive to the trigger event.

In addition to one or more of the features described herein, or as an alternative, in further embodiments, the microphone detects a trigger event and captures the audio data responsive to the trigger event.

In addition to one or more of the features described herein, or as an alternative, in further embodiments, local preprocessing is performed, at the conveyance system, on the one or more data streams to generate the sensor data.

In addition to one or more of the features described herein, or as an alternative, in further embodiments, the audio data captured by the microphone includes audio during a run of the conveyance system as well as audio of a run of a second conveyance system.

In addition to one or more of the features described herein, or as an alternative, in further embodiments, calibration is performed. The calibration includes determining one or more transformations between the sensor data and measurements taken by a measurement device.

In addition to one or more of the features described herein, or as an alternative, in further embodiments, the analytics system learns, by machine learning based on historical sensor data, to recognize the ride quality of the conveyance system.

In addition to one or more of the features described herein, or as an alternative, in further embodiments, the analytics system automatically performs a remedial action responsive to the ride quality of the conveyance system.

Technical effects of embodiments of the present disclosure include remote monitoring of the continuous ride quality of an conveyance system in real time, without the need for a technician to be present at the conveyance system. Thus, an alert can be generated to dispatch a technician if performance of the conveyance system is sufficiently degraded. Additionally, the technician can be alerted to likely problems and can therefore arrive prepared to make the expected repairs.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

A detailed description of one or more embodiments of the disclosed apparatus and method are presented herein by way of exemplification and not limitation with reference to the Figures.

Figure 1:
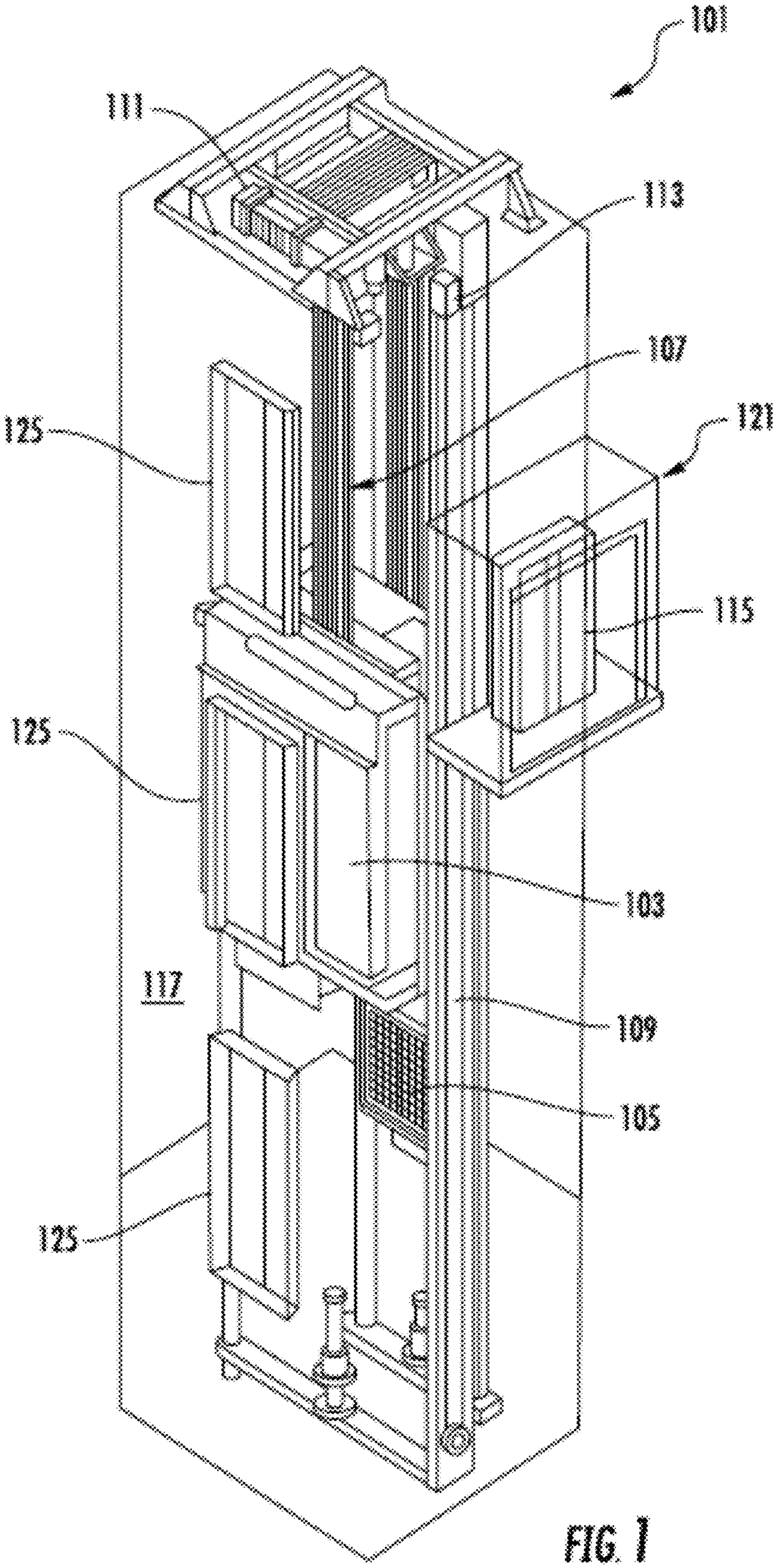
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system as the tension member 107, elevator systems 101 that employ other methods and mechanisms of moving an elevator car within an elevator hoistway 117 may employ embodiments of the present disclosure. For example, embodiments may be employed in ropeless elevator systems 101 using a linear motor to impart motion to an elevator car 103. An embodiment may also be employed in a ropeless elevator system 101 using a hydraulic lift to impart motion to an elevator car 103. FIG. 1 is merely a non-limiting example presented for illustrative and explanatory purposes.

Figure 2:
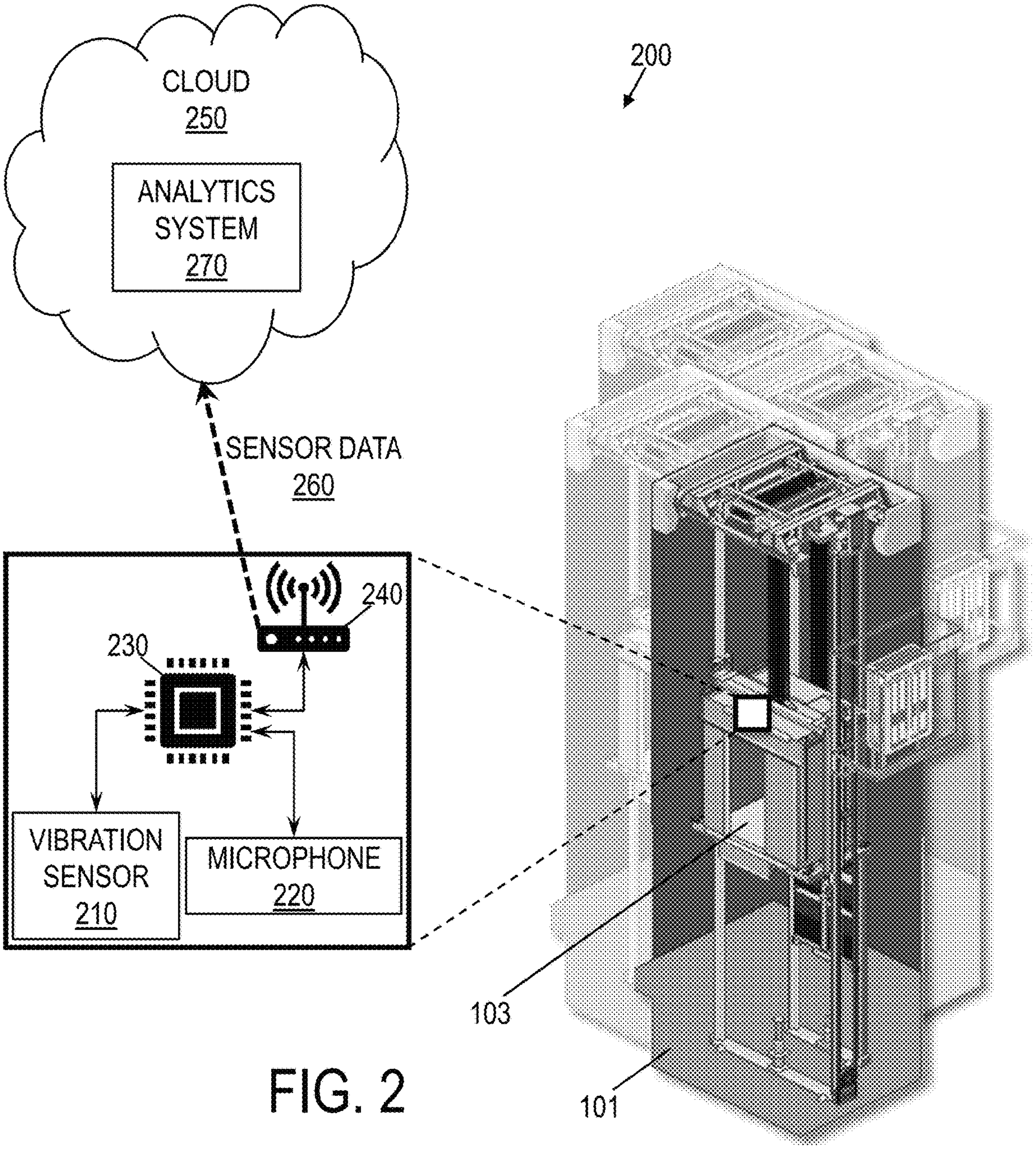
FIG. 2 is a diagram of a monitoring system for monitoring the continuous ride quality of a conveyance system, such as an elevator system, according to some embodiments of the present disclosure.

FIG. 2 is a diagram of a monitoring system 200 for monitoring the continuous ride quality of a conveyance system, such as an elevator system 101, according to some embodiments of this disclosure. Although this disclosure describes in detail application of the monitoring system 200 to an elevator system 101, it will be understood by one skilled in the art that various embodiments may be applicable to escalators or other conveyance systems.

In some embodiments, the monitoring system 200 includes one or more detection devices, such as a vibration sensor 210 and a microphone 220. In some embodiments, the vibration sensor 210 or the microphone 220, or both, are connected to a processing unit 230, which receives measurements from the connected vibration sensor 210 or microphone 220, or both. Through a communication device 240, the processing unit 230 may be connected to a cloud 250. The processing unit 230 may thus transmit sensor data 260 to the cloud 250, where an analytics system 270 may perform analytics to determine continuous ride quality and thereby monitor continuous ride quality remotely.

Although FIG. 2 shows the vibration sensor 210, the microphone 220, the processing unit 230, and the communication device 240 positioned together, this is for illustrative purposes only. When both the vibration sensor 210 and the microphone 220 are used, these may be separate devices or may be integrated together into a single detection device. Additionally, each of the processing unit 230 and the communication device 240 may be a distinct device as well. Further, these various components need not be positioned together in the elevator system 101 but, rather, may be distributed throughout the elevator system 101, as will be discussed further below. Thus, although FIG. 2 illustrates a single device as the vibration sensor 210, the microphone 220, the processing unit 230, and the communication device 240, it will be understood by one skilled in the art that the monitoring system 200 may include one or multiple devices for these purposes.

As shown in FIG. 2, the vibration sensor 210, the microphone 220, the processing unit 230, and the communication device 240 may be positioned above the elevator car 103. However, other positions of the monitoring system 200 may also be used. For example, and not by way of limitation, the vibration sensor 210 may be built into a wall of the elevator car 103 or affixed on a door header of the elevator car 103. For further example, the microphone may be integrated into the elevator car 103 as part of an in-car telecommunications systems, which may be useable for additional purposes other than those described herein. The processing unit 230 may be positioned so as to enable a connection with each of the vibration sensor 210 and the microphone 220, and the communication device 240 may be positioned so as to enable a connection with the processing unit 230. Each of the vibration sensor 210, the microphone 220, the processing unit 230, and the communication device 240 may be affixed to or integrated with the elevator system 101 or may be placed in or on aspects of the elevator system without being affixed.

As discussed above, conventionally, a portable device is used during commissioning and during maintenance to test the ride quality of an elevator system at the time of such commissioning or maintenance. However, the events of commissioning and maintenance are short-term, and thus the testing performed at those times is not sufficient to obtain a full picture of the ride quality. Additionally, because only a single person is typically involved with measuring the ride quality, no variation of passenger volumes is considered with conventional mechanisms. According to some embodiments of this disclosure, however, ride quality can be monitored on a continuous basis in real time. Further, because the vibration sensor 210 may have higher fidelity than a conventional device used to measure ride quality, the measurements taken may be more reliable. Further, because further analytics may be performed in the cloud 250, the ride quality can be monitored and analyzed remotely, with various passenger volumes.

In some embodiments of this disclosure, the vibration sensor 210 is an accelerometer, such as a three-axis accelerometer. Thus, the vibration sensor 210 may detect vibrations in three dimensions. In some embodiments, the vibration sensor 210 may detect vibrations in one or two dimensions. In some embodiments, multiple vibration sensors 210 may be used. Generally, the vibration sensor 210 may output a data stream of vibration data, which includes measurements that describe vibrations detected during an elevator run of the elevator system 101. The vibration sensor 210 may be in communication with the processing unit 230 and may thus transmit that data stream to the processing unit 230.

In contrast to the conventional portable device, the vibration sensor 210 may remain with the elevator system 101 regardless of whether a technician is present. Specifically, the vibration sensor 210 may stay with the elevator system 101 continuously from installation until removal, which may be days, months, or years later. During that time, the vibration sensor 210 may continue to measure vibrations of the elevator car 103. Additionally, the vibration sensor 210 may continue to deliver detected measurements to the processing unit 230.

In some embodiments of this disclosure, the vibration sensor 210 need not detect vibrations all the time. Rather, the vibration sensor 210 may be in either sleep mode or active mode at a given time, such that the vibration sensor 210 measures vibrations during active mode but not during sleep mode. In such embodiments, the active mode may be triggered responsive to a set of one or more trigger events, where the existence of at least one trigger event causes the vibration sensor 210 to switch to active mode. For example, and not by way of limitation, a trigger event may be the presence of at least one person inside the elevator car. To this end, for instance, a motion sensor or other device for detecting presence may be in communication with the vibration sensor 210, or a motion sensor or other presence detector may be in communication with the controller 115, which may communicate information as needed to the vibration sensor 210. In this manner, the vibration sensor 210 may be switched to active mode when a trigger event occurs. For additional examples, trigger events may include one or more of the following: movement of the elevator car 103, which may be detected by the controller 115; or the elevator doors being closed, which may also be detected by the controller 115.

The vibration sensor 210 may return to sleep mode responsive to a set of one or more sleep events, where the existence of at least one of such sleep events may cause the vibration sensor 210 to switch into sleep mode. Sleep events may include one or more of the following, for example: passage of a predetermined period of time after the last trigger event occurred; having reached a landing, which may be detected by the controller 115; or the elevator doors being open, which may be detected by the controller 115. Detection of a trigger event or a sleep event may be implemented in various ways, such as connecting a sensor of the trigger events and the sleep events to the processing unit 230 or to the controller 115, either of which may activate or deactivate the vibration sensor 210 as needed.

The microphone 220 captures audio associated with movement of the elevator car 103 and, specifically, movement during an elevator run. Generally, this can be useful because a typical elevator ride is relatively quiet without unexpected noises, and the sound of the ride typically falls within an expected range. The microphone 220 may be positioned inside the elevator car, on top of the elevator car 103, or elsewhere in a position where the microphone 220 is capable of catching sounds emitted by movement of the elevator car 103. The microphone 220 may output a data stream of audio data representing the audio captured. The microphone 220 may be in communication with the processing unit 230 and may thus transmit this data stream to the processing unit 230.

When the microphone 220 is positioned on top of the elevator car 103, the audio captured may relate to not only the elevator system 101 in which the microphone is positioned, but also to one or more other nearby elevator systems 101. In other words, when positioned over the elevator car 103, the microphone is not isolated from background noise caused by nearby elevator systems 101 within the range of the microphone 220, and thus the microphone's output relates to those nearby elevator systems 101 as well. For instance, a group of two or more elevator systems 101 may be positioned nearby one another, perhaps sharing an elevator bay, and perhaps having connected or nearby elevator shafts. In that case, a microphone 220 positioned on top of the elevator car 103 of one of such elevator systems 101 may pick up audio representing the movements of the other elevator cars 103. This can be advantageous because, in some embodiments, a nearby elevator system 101 can be monitored by the monitoring system 200 without itself being outfitted with a microphone 220.

In some embodiments of this disclosure, the microphone 220 need not capture audio all the time. Rather, the microphone 220 may be in either sleep mode or active mode at a given time, such that the microphone 220 captures audio during its active mode but not during its sleep mode. In such embodiments, the active mode may be triggered responsive to a trigger event, and the sleep mode may be triggered responsive to a sleep event. For example, and not by way of limitation, a sleep event may be the presence of at least one person inside the elevator car. When passengers are present in the elevator car 103, the microphone 220 would pick up audio created by those passengers, and thus, some embodiments capture audio only when the elevator car 103 is empty. To this end, for instance, a motion sensor or other device for detecting presence may be in communication with the microphone 220, or a motion sensor or other presence detector may be in communication with the controller 115, which may communicate presence as needed to the microphone 220. For another example, a trigger event may be the detection of no passengers present in the elevator car 103, and thus, the microphone 220 may resume capturing sounds when the elevator car 103 is empty. Detection of a trigger event or a sleep event may be implemented in various ways, such as connecting a sensor of the trigger events and the sleep events to the processing unit 230 or to the controller 115, either of which may activate or deactivate the microphone 220 as needed.

In some embodiments of this disclosure, both the vibration sensor 210 and the microphone 220 can operate at the same time, such that both vibrations and audio are measured simultaneously. As discussed above, both the vibration sensor 210 and the microphone 220 may be in communication with the processing unit 230. Thus, if the monitoring system 200 includes a vibration sensor 210, the processing unit 230 may receive a respective data stream from the vibration sensor 210, and if the monitoring system 200 includes a microphone 220, the processing unit 230 may receive a respective data stream from the microphone 220.

The processing unit 230 may perform local preprocessing on each data stream received. For example, and not by way of limitation, the preprocessing may include one or more of the following: compression, removal of data within threshold values, or other operations. In some embodiments, preprocessing can reduce network traffic from the processing unit 230 to the cloud 250 or can reduce or eliminate data likely to not be useful to the analytics system 270.

The processing unit 230 may transmit sensor data 260 to the cloud 250, where sensor data 260 is the data received from the vibration sensor 210 or the microphone 220, or both. As discussed above, the processing unit 230 may perform preprocessing on the data streams in some embodiments, and thus the sensor data 260 transmitted to the cloud 250 need not be raw data from the data streams but, rather, may be the data resulting from preprocessing the data streams. However, if preprocessing is not performed, then the sensor data 260 may be the same as the data streams received by the processing unit 230. In some embodiments of this disclosure, the processing unit 230 transmits the sensor data 260 to the cloud 250 autonomously, for example, in real time, responsive to having received the data streams. Additionally or alternatively, the cloud 250 may request to receive the sensor data 260, and the processing unit 230 may thus transmit the sensor data 260 on demand.

To enable transmission of the sensor data 260, the processing unit 230 may be connected to the communication device 240. The connection between the processing unit 230 and the communication device 240 may be wired or wireless, such as, for example, ethernet, optical, wireless fidelity (WiFi), Zigbee, Zwave, Bluetooth, or any other known communications protocol. For example, and not by way of limitation, the communication device 240 may be a cellular gateway or other device capable of communicating with the cloud 250.

The cloud 250 may include one or more nodes, each of which may be a computing device or a portion of computing device. Through these nodes, the cloud 250 may execute an analytics system 270, which may perform analytics on the sensor data 260 received from the processing unit 230. Generally, the analytics system 270 may seek to determine the ride quality of the elevator system 101, or the ride quality of the elevator system 101 and one or more nearby elevator systems 101.

In some embodiments of this disclosure, the analytics system 270 utilizes machine learning to analyze the sensor data 260 received from the processing unit 230. For instance, the analytics system 270 may include a cognitive engine that is trained on historical sensor data 260 associated with labels. This historical sensor data 260 may include data from the vibration sensor 210 or the microphone 220, or both. Specifically, the labels may associate certain portions of the historical sensor data 260 with respective ride qualities, such as a specific levels of ride quality. For example, and not by way of limitation, if it is desired to group ride quality into three levels, then portions of the historical sensor data 260 may be labeled according to those three levels. After being trained, the cognitive engine may thus be capable of receiving sensor data 260 and determining ride quality of the received sensor data 260. For example, given three levels of ride quality, the cognitive engine may be capable of identifying the ride quality level in each portion of sensor data 260.

In some embodiments, the analytics system 270 automatically performs remedial actions responsive to various levels of ride quality that are less than an established minimum level. For example, and not by way of limitation, a remedial action may be issuance of an alert, which may notify an owner or maintenance organization of the elevator system 101 that maintenance is needed. For example, and not by way of limitation, if the analytics system 270 is capable of associating a portion of sensor data 260 with a quality level selected from a set of three quality levels, Level 1, Level 2, and Level 3, where an increasing level number indicates increasing quality, then Level 2 may be considered the minimum acceptable level. In that case, a quality of Level 2 may cause the analytics system 270 to issue an alert indicating that maintenance may be needed, while a quality of Level 1 may cause the analytics system 270 to issue an alert that maintenance is urgently needed. Upon being notified of the alert, the maintenance organization can dispatch a technician to check the elevator system 101 in person. Thus, rather than determining ride quality only when a technician is present, as is conventionally the case, embodiments of this disclosure enable ride quality to be monitored continuously and remotely.

Figure 3:
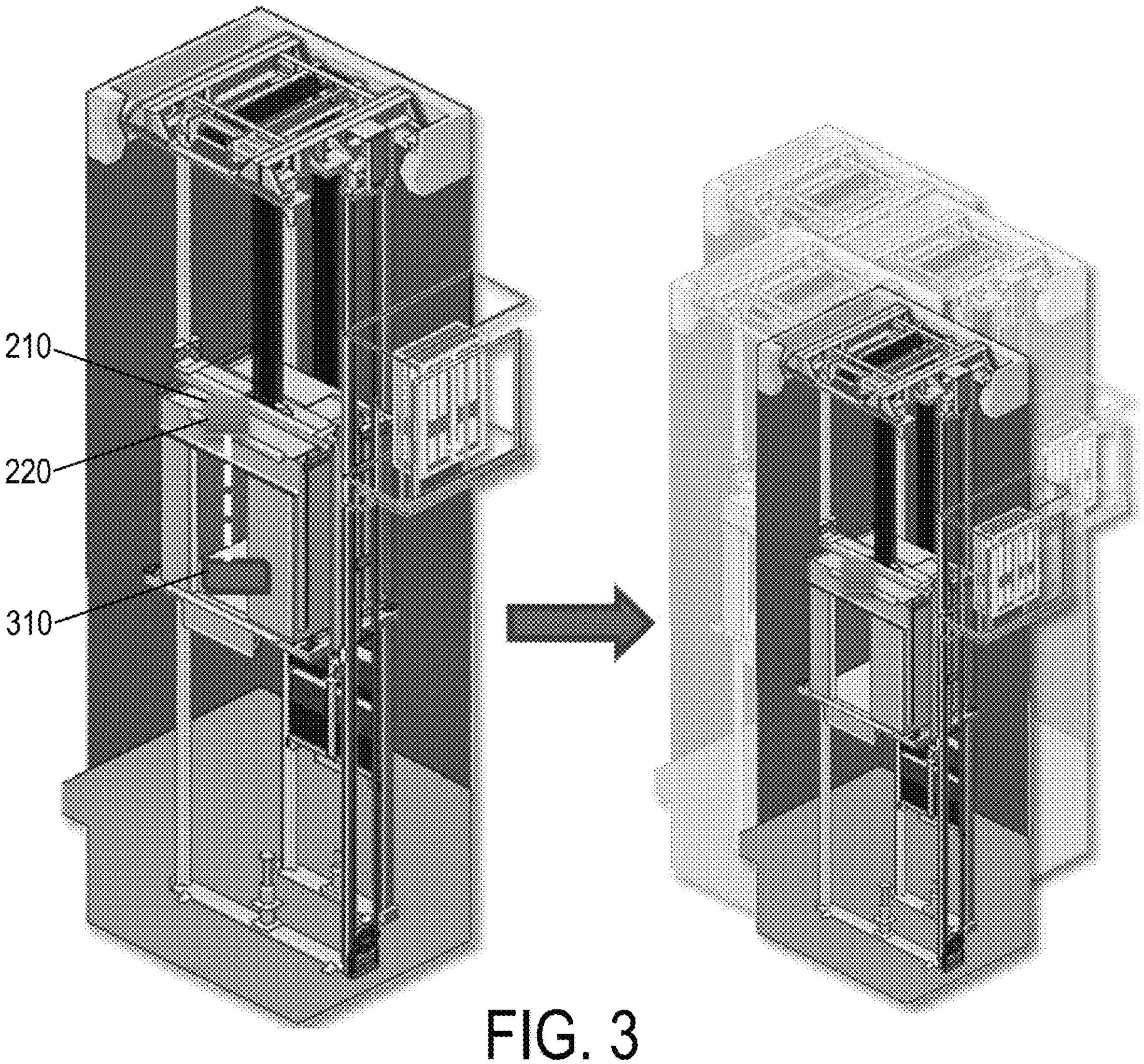
FIG. 3 illustrates calibration of the monitoring system, according to some embodiments of the present disclosure.

In some embodiments of this disclosure, analysis performed by the analytics system 270 may be facilitated by calibration. FIG. 3 illustrates calibration of the monitoring system 200, according to some embodiments of this disclosure. As shown in FIG. 3, in some embodiments, calibration of the monitoring system 200 is performed through the use of the vibration sensor 210 or the microphone 220, or both, in conjunction with the conventional portable device 310 or other measurement device used manually. Although calibration is discussed as being performed with the portable device 310 herein, it will be understood that other measurement devices useable by a technician may be used during calibration as well. To perform calibration, the portable device 310 may be placed on the floor of the elevator car 103 as usual. Because use of the portable device 310 is well-known, there may exist established thresholds indicating acceptable measurements by the portable device.

During calibration, the portable device 310 may take measurements during movement of the elevator car 103, while the vibration sensor 210 is also taking measurements or the microphone 220 is capturing audio, or both. Through techniques known in the art, one or more transformations may be established to map sensor data 260 of the vibration sensor 210 or the microphone 220, or both, to measurements output by the portable device 310. Specifically, for example, the sensor data 260 and the measurements of the portable device 310 may be transmitted to the cloud 250, where the analytics system 270 may determine the one or more transformations. As such, because one or more acceptable ranges of measurements of the portable device 310 are known, it can be determined which measurements of the vibration sensor 210 or the microphone 220, or both, represent an acceptable ride quality through the use of these one or more transformations.

Thus, in this manner, the monitoring system 200 may be trained offline. Further, in some embodiments, the analytics system 270 utilizes the resulting one or more transformations to analyze continuous ride quality remotely, based on current sensor data 260.

Figure 4:
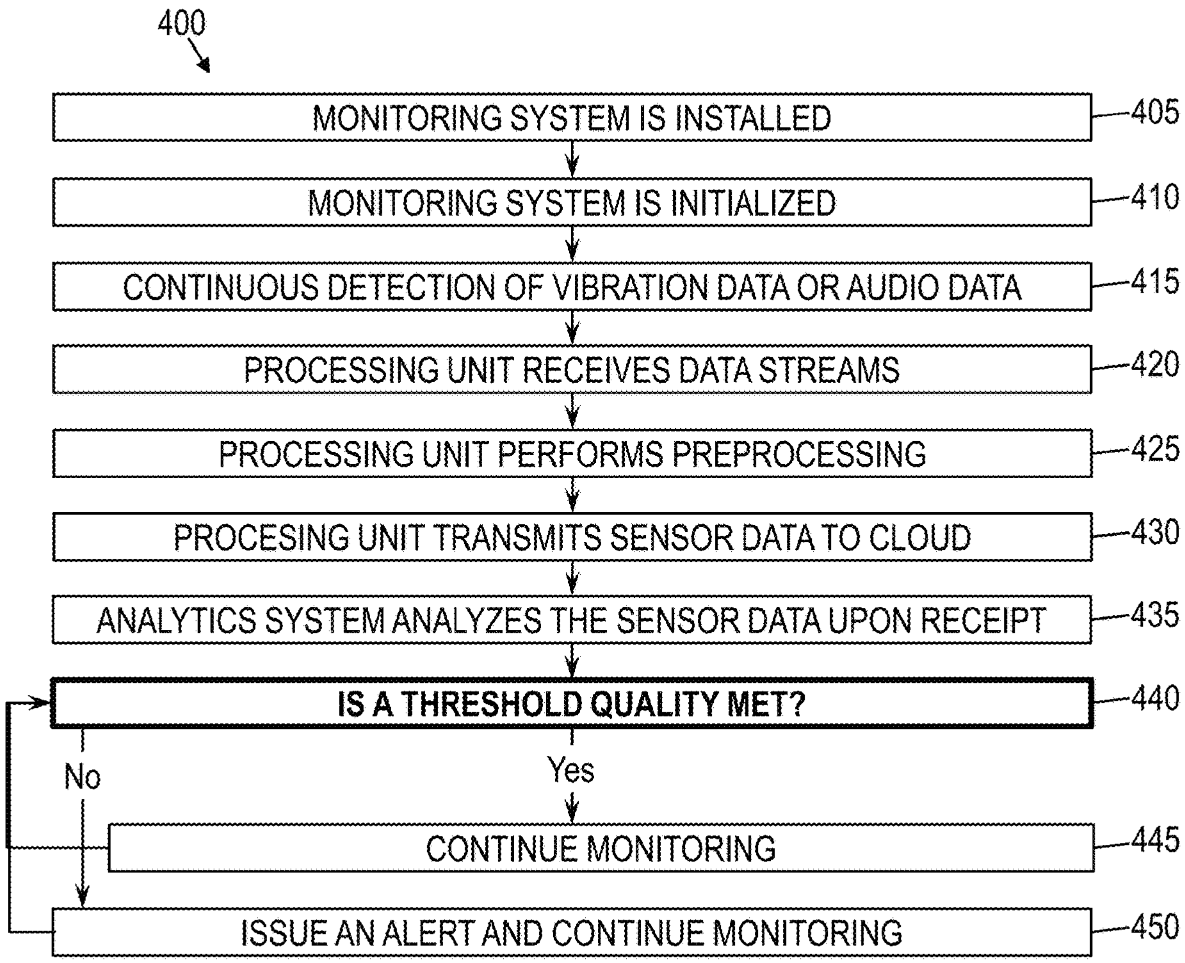
FIG. 4 is a flow diagram of a method of monitoring continuous ride quality, according to some embodiments of the present disclosure.

FIG. 4 is a flow diagram of a method of monitoring continuous ride quality, according to some embodiments of this disclosure. It will be understood that this method 400 is an illustrative example and does not limit the various embodiments of this disclosure.

As shown in FIG. 4, at block 405, the monitoring system 200 is installed in an elevator system 101. In some embodiments, this occurs during commissioning of the elevator system 101, but alternatively, the monitoring system 200 may be installed in an elevator system 101 after the elevator system 101 has entered into regular use. As discussed above, the positioning of various components of the monitoring system 200 may vary.

At block 410, the monitoring system 200 is initialized, which may include, for example, calibration or cognitive training. As discussed above, calibration may involve training the analytics system 270 to recognize various levels of ride quality by determining a transformation between measurements of the vibration sensor 210 or microphone 220 and measurements of the portable device 310. Additionally or alternatively, the analytics system may learn, via machine learning, to recognize levels of ride quality in sensor data 260.

At block 415, the monitoring system 200 continuously detects at least one of vibration data and audio data. This may occur without manual supervision. Further, the detection by each of the vibration sensor 210 and the microphone 220 need not occur at every moment. Rather, each of the vibration sensor 210 and the microphone 220 may be associated with a respective set of trigger events, which cause them to begin detecting and generating a respective data stream, and a respective set of sleep events, which cause them to stop detecting and thus stop generating a respective data stream.

At block 420, the processing unit 230 of the monitoring system 200 receives a respective data stream from each of the vibration sensor 210 and the microphone 220. At block 425, the processing unit 230 preprocesses the data streams, which results in sensor data 260. At block 430, the processing unit 230 transmits the sensor data 260 through a communication device 240 to the cloud 250. At block 435, in the cloud, the analytics system 270 analyzes the sensor data 260 as it is received to thereby monitor the continuous ride quality remotely and in real time.

At decision block 440, the analytics system 270 determines whether the sensor data 260 received meets a threshold quality. If the threshold quality is met, then at block 445, the analytics system 270 continues receiving sensor data 260 and analyzing the sensor data 260 as it arrives. If the threshold quality is not met, however, then at block 450, the analytics system 270 additionally issues an alert indicating that maintenance may be required. In either case, the analytics system 270 may continue to monitor the elevator system 101 by analyzing the sensor data 260 as it is received.

Thus, according to embodiments of this disclosure, ride quality of an elevator system 101 or group of elevator systems 101 can be monitored continuously and remotely, regardless of whether a technician is present. In some embodiments, this remote monitoring occurs in real time and can therefore be used to initiate maintenance visits on an as-needed basis.

As described above, embodiments can be in the form of processing unit-implemented processes and devices for practicing those processes, such as a processing unit. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessing unit, the computer program code segments configure the microprocessing unit to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A monitoring system comprising:

one or more detection devices configured to generate, at an elevator system, one or more data streams describing a ride of the elevator system and comprising vibration data and audio data, wherein the one or more detection devices comprise a vibration sensor configured to generate the vibration data and a microphone configured to capture the audio data;

a communication device configured to transmit sensor data based on the one or more data streams; and an analytics system remote from the elevator system, wherein the analytics system is configured to receive the sensor data from the communication device and to determine a ride quality of the elevator system, based on the sensor data;

wherein:

the vibration sensor is configured to be placed in a sleep mode and the active mode, such that the vibration sensor measures vibrations during the active mode but not during the sleep mode, wherein the active mode of the vibration sensor is triggered in response to a first trigger event; and the microphone is configured to be placed in a sleep mode and the active mode, such that the microphone captures audio during the active mode but not during the sleep mode; wherein the active mode of the microphone is triggered in response to a second trigger event different than the first trigger event, the second trigger event being the detection of no passengers present in an elevator car.

2. The monitoring system of claim 1, further comprising:

a sensor of trigger events; and wherein the vibration sensor is further configured to:

be activated upon detection of the first trigger event by the sensor of trigger events; and generate the vibration data in the one or more data streams responsive to the first trigger event, wherein the vibration data describes vibrations of the elevator system.

3. The monitoring system of claim 1, further comprising:

a sensor of trigger events; and wherein the microphone is further configured to:

be activated upon detection of the second trigger event by the sensor of trigger events; and capture the audio data in the one or more data streams responsive to the second trigger event, wherein the audio data describes audio during a run of the elevator system.

4. The monitoring system of claim 1, wherein the audio data describes audio during a run of the elevator system and audio of a run of a second elevator system within a range of the microphone.

5. The monitoring system of claim 1, further comprising a processing unit configured to perform local preprocessing, at the elevator system, on the one or more data streams to generate the sensor data.

6. The monitoring system of claim 5, wherein the processing unit is further configured to locally perform calibration at the elevator system, and wherein the calibration comprises determining one or more transformations between the sensor data and a plurality of measurements taken by a measurement device.

7. The monitoring system of claim 1, wherein the analytics system is further configured to learn, by machine learning based on historical sensor data, to recognize the ride quality of the elevator system.

8. The monitoring system of claim 1, wherein the analytics system is further configured to automatically perform a remedial action responsive to the ride quality of the elevator system.

9. A monitoring method comprising:

generating, at an elevator system, one or more data streams describing a ride of the elevator system and comprising vibration data generated by a vibration sensor and audio data captured by a microphone;

detecting a trigger event;

triggering an active mode in response to the trigger event, wherein the vibration sensor measures vibrations during the active mode and the microphone captures audio during the active mode;

transmitting, to an analytics system remote from the elevator system, sensor data based on the one or more data streams; and determining a ride quality of the elevator system, based on the sensor data;

wherein the vibration sensor is configured to be placed in a sleep mode and the active mode, such that the vibration sensor measures vibrations during the active mode but not during the sleep mode, wherein the active mode of the vibration sensor is triggered in response to a first trigger event;

wherein the microphone is configured to be placed in a sleep mode and the active mode, such that the microphone captures audio during the active mode but not during the sleep mode, wherein the active mode of the microphone is triggered in response to a second trigger event different than the first trigger event, the second trigger event being the detection of no passengers present in an elevator car.

10. The monitoring method of claim 9, wherein the monitoring method further comprises:

detecting, by a sensor of trigger events, the first trigger event; and generating the vibration data in the one or more data streams responsive to the first trigger event, wherein the vibration data describes vibrations of the elevator system.

11. The monitoring method of claim 9, wherein the monitoring method further comprises:

detecting, by a sensor of trigger events, the second trigger event; and capturing the audio data in the one or more data streams responsive to the second trigger event, wherein the audio data describes audio during a run of the elevator system.

12. The monitoring method of claim 9, further comprising performing local preprocessing, at the elevator system, on the one or more data streams to generate the sensor data.

13. A computer-program product for monitoring a elevator system, the computer-program product comprising a non-transitory computer-readable storage medium having program instructions embodied therewith, the program instructions executable by a processing unit to cause the processing unit to perform a method comprising:

generating, at the elevator system, one or more data streams describing a ride of the elevator system and comprising of vibration data generated by a vibration sensor and audio data captured by a microphone;

detecting a trigger event;

triggering an active mode in response to the trigger event, wherein the vibration sensor measures vibrations during the active mode and the microphone captures audio during the active mode;

transmitting, to an analytics system remote from the elevator system, sensor data based on the one or more data streams; and determining a ride quality of the elevator system, based on the sensor data;

wherein the vibration sensor is configured to be placed in a sleep mode and the active mode, such that the vibration sensor measures vibrations during the active mode but not during the sleep mode, wherein the active mode of the vibration sensor is triggered in response to a first trigger event;

wherein the microphone is configured to be placed in a sleep mode and the active mode, such that the microphone captures audio during the active mode but not during the sleep mode, wherein the active mode of the microphone is triggered in response to a second trigger event different than the first trigger event, the second trigger event being the detection of no passengers present in an elevator car.

14. The computer-program product of claim 13, wherein the method further comprises:

detecting, by a sensor of trigger events, the first trigger event; and generating the vibration data in the one or more data streams responsive to the first trigger event, wherein the vibration data describes vibrations of the elevator system.

15. The computer-program product of claim 13, wherein the method further comprises:

detecting, by a sensor of trigger events, the second trigger event; and capturing the audio data in the one or more data streams responsive to the second trigger event, wherein the audio data describes audio during a run of the elevator system.

16. The computer-program product of claim 13, the method further comprising performing local preprocessing, at the elevator system, on the one or more data streams to generate the sensor data.

* * * * *